Figure 1:
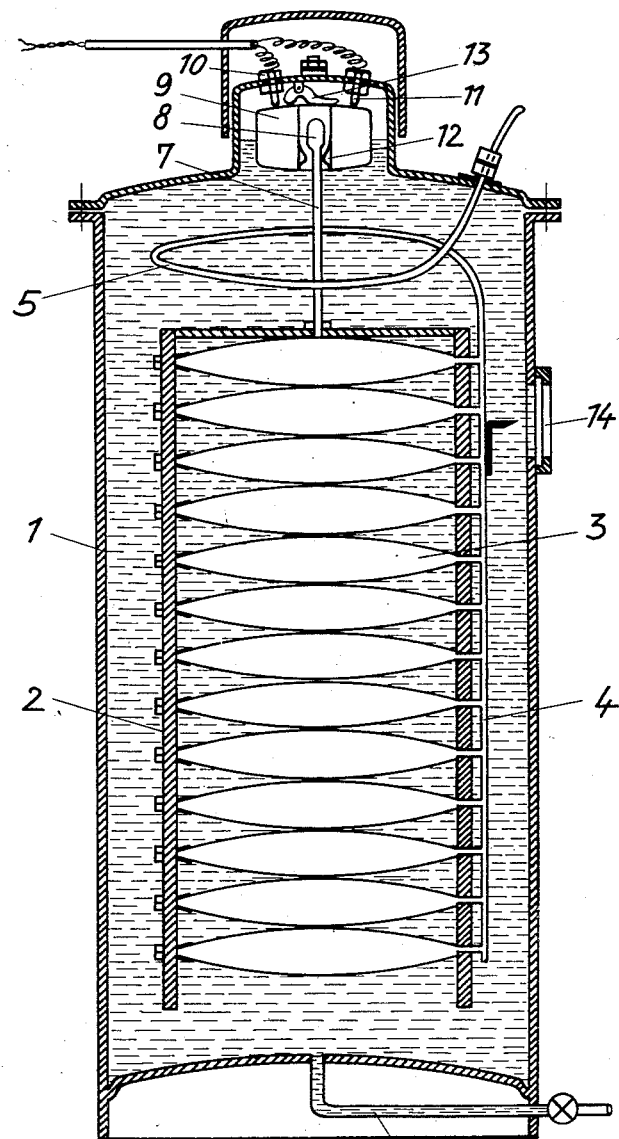

March 11, 1958 G. REUSCHLE ET AL 2,826,629
HIGH PRESSURE TANKS FOR OIL CABLE INSTALLATIONS
Filed Nov. 12, 1952 2 Sheets-Sheet 2

Inventors.
G. Reuschle
W. Ochel
K. Ditgens
By: Glascock Downing & Seebold
Attys.

United States Patent Office 2,826,629
Patented Mar. 11, 1958

2,826,629

HIGH PRESSURE TANKS FOR OIL CABLE INSTALLATIONS

Georg Reuschle, Koln-Bruck, Werner Ochel, Koln-Dunnwald, and Karl Ditgens, Koln-Mulheim, Germany, assignors to Felten & Guilleaume Carlswerk Aktiengesellschaft, Koln-Mulheim, Germany Application November 12, 1952, Serial No. 320,024

Claims priority, application Germany December 21, 1951

4 Claims. (Cl. 174—11)

With the normal oil pressure tanks as used hitherto, the object of which is to take up the oil liberated, on the appropriate cable becoming heated, and giving it up again to the cable, on the latter cooling down, one or more cells made of flexible sheet metal are mounted in these tanks. These cells are filled with air, in a given case under slightly raised pressure, but are not interconnected by piping. The space between the cells and the container wall is filled with oil which by pumping in oil is placed under a certain pressure. This pressure is accurately adjustable, causing the air in the cells to be compressed. This arrangement made it possible on the one hand to force oil out of the container into the cable, while on the other hand the cable could release oil to the container. A serious disadvantage of this arrangement is, however, that it is applicable only up to a pressure of about 2 above atmospheric pressure, as a greater pressure changes the oil capacity only slightly and the flexible cells would be deformed to such an extent that they would no longer be able to fulfill their purpose. This change is, however, beyond any control.

Another way of dealing with the problem is to connect the individual flexible cells inside the container to one another by piping and to the outside with the cable, the cells being filled with oil. The space surrounding the cells is also filled with oil. In the container, however, a certain free space is left at the top, so that the variations of the oil level in the tank can be kept under observation in order to be able to determine, to what extent the cells are filled with oil. This arrangement has the disadvantage, however, that it is not possible to ascertain, whether one of the cells may have become leaky. The apparatus will continue to function, as if it were intact, actually however the air-saturated oil of the tank will penetrate through the leaky place into the cells and from there into the cable. The insulation value of the cable will thereby be greatly reduced.

The invention has for its object to provide a high pressure tank for oil cable installations, the functioning of which is directly dependent on the condition of the cell walls or will indicate any exceeding of the elastic limit or any leakage in the cell walls. The proposed apparatus is, therefore, a high pressure tank for oil cable installations with flexible cells housed in a container, which are connected by piping with one another and with a gas pressure supply, the interior of the container being filled with oil and connected to the cable, in which one, several or all the flexible cells are fixed in a framework which slides upwards and downwards in dependence on the pressure fluctuations caused by the breathing of the cable, the piping connection within the container between the fixed cells and the gas pressure supply being very flexible. Through the breathing of the cable the pressure on the cells exerted by the oil accumulated in the container varies, causing the cells to be compressed to a greater or less extent. Owing to the flexible construction of the cell wall, the cells diminish or enlarge their volume. This alters their buoyancy and the framework, in which the cells are fixed, will slide upwards and downwards. Should, however, the rise or fall in pressure exceed the admissible amount, the flexible walls of the cells will suffer a permanent deformation. This will cause the framework with the cells either to sink to the bottom or to float right at the top in the container, so that the cessation of the state of suspension indicates that the apparatus is no longer intact.

So as to obviate the necessity of constantly watching the sliding cell frame, the invention further suggests an arrangement by which through the upward and downward motion of the framework a "maximum and minimum contact" is directly or indirectly actuated, which responds before the permissible limit of the compression and expansion of the cells is exceeded. The expression "maximum and minimum contact" is intended to mean an electric contact arranged to be opened when the framework reaches its highest as well as its lowest position. For the permissible amount of compression or expansion of the cells a value will of course be selected, which lies below the permissible elastic limit of the cell walls, so as to put the apparatus out of operation, before a definite deformation of the cell walls takes place.

According to a further feature of the invention it is proposed to cause the actuation of the maximum and minimum contact to be brought about by means of a float resting on the surface of the oil, which, on air accumulating above the level of the oil, sinks down and causes the contact to respond. In this way it is possible by means of one and the same indicating device or warning signal to announce both an impending exceeding of the elastic limit and any leakage of the cell walls.

The arrangement according to the invention is of course not confined to any particular constructional form of the warning device. According to a further feature of the invention the upwardly and downwardly sliding framework may be caused directly or indirectly to exert a pressure proportional to its buoyancy against a diaphragm member filled with an indicating fluid, so that the changes in volume of the cells can be read off on a pressure gauge connected to the diaphragm member. Another possibility according to the invention is, for the upwardly and downwardly sliding framework to exert directly or indirectly a pressure proportional to its buoyancy on a body composed of superposed layers of graphite, so that by measuring the electric resistance the changes in volume can be measured.

Now, in all these arrangements it is necessary to connect the space within the cells ascending and descending with the framework with the gas pressure supply or a compressed air container. It is now proposed to lead the compressed air to the flexible cells through a spiral, resilient pipe line or through a flexible, oiltight hose. Such arrangements must not in any way impair the ability of the cell framework to slide freely.

As stated above, it is necessary for the correct functioning of the apparatus to have a constant mean gas pressure in the cells. It is well known, however, that the gas pressure is greatly influenced by the temperature. It is therefore to be recommended, according to a further feature of the invention, to take the compressed air for the cells from a compensating tank buried in the soil. Such a buried tank is only very slightly affected by temperature variations.

As approximately the same pressure acts on the cell walls from within and without, it is possible through the mode of construction described above to use the high pressure tanks for pressures up to 15 and 20 atmospheres.

Figure 2:
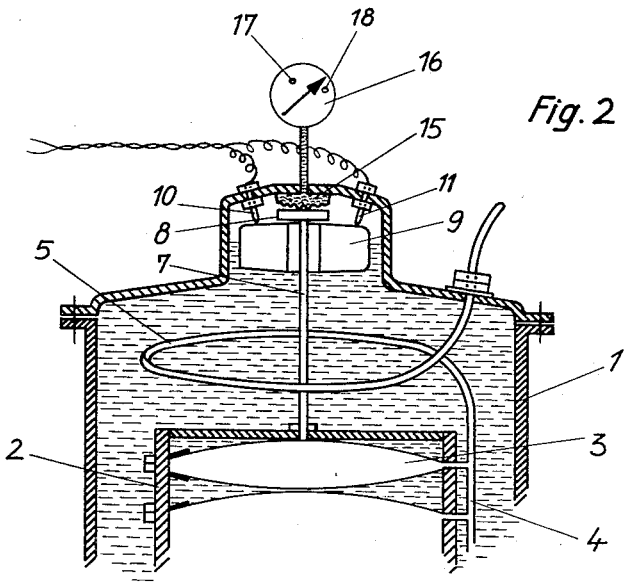
Figure 3:
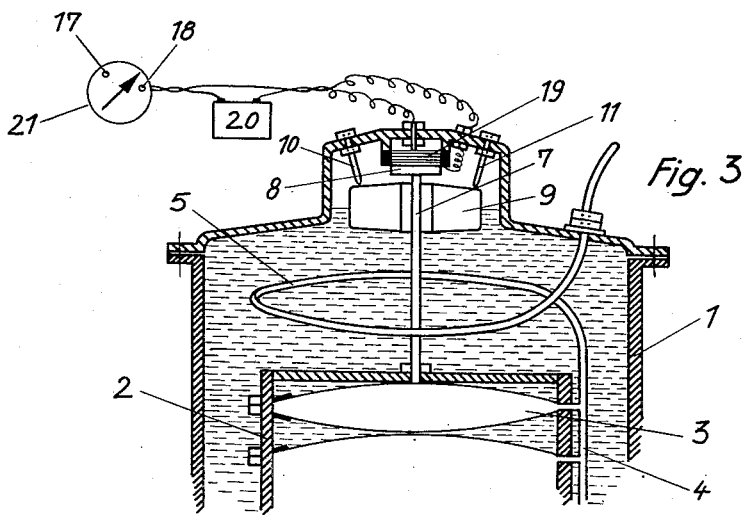

In the accompanying drawing Figures 1, 2 and 3 show by way of example diagrammatically in longitudinal section constructional form of the high pressure tank for oil cable installations according to the invention.

In all the constructions 1 is the container which contains a framework 2, in which for instance thirteen flexible cells 3 are fixed. The framework may be arranged so as to be capable of moving freely or so as to slide on rollers (not shown) in the container.

The cells are connected to one another by the pipe line 4 and to the gas pressure supply or a pressure tank by the spiral, very flexible pipe 5. The connection 6 connects the oil-filled interior space of the container 1 with the cable.

In the construction shown in Figure 1, framework 2 has at the top a driver rod 7, the head 8 of which is guided in a bore of the float 9. In the normal state the circuit for the indicating or warning device (contacts 10 and 11) is closed by the float 9. An opening of this circuit takes place in the following three cases. (1) On the framework sinking, the head 8 of the driver rod 7 carries, on the admissible amount being exceeded, the float down with it through engaging the lugs 12, and the contacts 10 and 11 are opened. (2) Should the framework slide too far upwards, the head 8 of the driver rod 7 will lift the right arm of the two-arm lever 13. At the same time the left arm of the lever goes down and presses the float 9 downwards, whereby the contacts 10 and 11 are opened. (3) If there are any leaky points in the walls of the cells 3 through which the gas can escape from the cells, the same rises in the container 1 and collects in its upper part. This causes the oil-level in the container 1, and also the float 9, to sink, and the contacts 10 and 11 are again opened.

Thus, in the cases (1) and (2) the operation of the maximum and minimum contact corresponds to the highest and lowest position of the framework 2 in the container 1. In addition thereto, the contacts 10 and 11 are also opened in the case (3) when the cells are leaky and therefore the arrangement is not in a condition to be used.

In order to be able to observe the upward and downward sliding of the framework 2 directly an observation window 14 is provided on the container 1.

In the construction shown in Figure 2, there is provided at the upper end of the container 1, for constant indication of the buoyancy of the framework 2, a diaphragm 15 which is filled with an indicating liquid and is acted upon by the framework 2 by its driver rod 7 provided with a head 8. The indicating device consists of a manometer 16 which indicates the pressure of the indicating liquid of the diaphragm 15 and thus the buoyancy of the framework 2. The manometer 16 may be provided with contacts 17, 18 for maximum and minimum readings.

Referring to Figure 3, the disc-like head 8 of the framework 2 acts on a graphite body 19, which is incorporated in the upper part of the container 1, and the pressure-sensitive electrical resistance of which is indicated continuously by means of an electric battery 20 and electrical measuring device 21. Also in this case contacts 17 and 18 for maximum and minimum readings may be provided in the measuring device 21 itself.

The measuring devices 16 shown in Figure 2 and 21 shown in Figure 3 are preferably calibrated to correspond to the volume of oil in the container 1 so that the oil content of the container 1 can be read directly at any time.

If the cells 3 become leaky the release in the case of the construction shown in Figures 2 and 3 as described above with reference to Figure 1, by this that the gas escaping from the cells 3 presses the oil level in the container 1 downwards, whereby the float 9, which sinks with the level of the oil, opens the contacts 10 and 11.

The advantage of the arrangements shown in Figures 2 and 3 as compared with that shown in Figure 1 is, that the vertical movement of the framework 2 is very small so that the flexible pipe 5 has to be bent only to an extremely small extent.

We claim:

1. High pressure tank for oil cable installations comprising: a container, flexible cells housed in the container, piping connecting the flexible cells with one another, a filling of oil in the container, a connection between the oil in the container and the oil in the cable, a framework capable of sliding up and down within the container, in which framework at least one of the said flexible cells is fixed, a connector fixed to the container for connection with a supply of compressed gaseous medium, a very flexible pipe connecting the said piping to the said connector, whereby relative movement can take place between the cells in the framework and the container and said connector during the up and down sliding movement of the framework, a float floating on the oil filling in the container, a rod secured to the framework, means for indicating upward movement of the rod at least beyond a predetermined limit, a driving head on the said rod capable, for a predetermined downward movement thereof, of pressing and moving the float downward, and means capable of indicating the downward movement of the float.

2. High pressure tank for oil cable installations as claimed in claim 1 comprising a maximum and minimum contact which is actuable by downward movement of the float or by the rod in upward movement beyond said predetermined limit, whereby said maximum and minimum contact is actuated before the permissible limit of compression and expansion of the cells is exceeded.

3. High pressure tank for oil cable installations as claimed in claim 2, in which the upward movement indicating means comprises a diaphragm member filled with an insulating-liquid arranged in the path of the up and down movement of the driving head on said rod and a pressure gauge connected to said diaphragm member, whereby pressure is exerted by the driving head upon the diaphragm member which is in proportion to the buoyancy of the framework and the changes in volume of the cells can be read off on the pressure gauge.

4. High pressure tank for oil cable installations as claimed in claim 1, in which the upward movement indicating means comprises a body composed of superposed layers of graphite arranged in the path of the up and down movement of the driving head whereby a pressure is created by the driving head in the graphite proportional to the buoyancy of the framework, and the changes in volume of the cells can be measured by measuring the electrical resistance of the body.

References Cited in the file of this patent

UNITED STATES PATENTS

| 1,613,418 | Uebelmesser | Jan. 4, 1927 |
| 1,768,446 | Gron | June 24, 1930 |
| 1,829,489 | Mularkey | Oct. 27, 1931 |
| 1,853,884 | Roper | Apr. 12, 1932 |
| 1,933,313 | Clark | Oct. 31, 1933 |
| 2,025,670 | Pettee | Dec. 24, 1935 |
| 2,439,342 | Hudson | Apr. 6, 1948 |

FOREIGN PATENTS

| 759,107 | France | Jan. 29, 1934 |